A. SCHILLING.
APPARATUS FOR THE TRANSPORTATION OF SOLIDS IN PIPE LINES.
APPLICATION FILED MAR. 29, 1917.
1,264,688.
Patented Apr. 30, 1918.
2 SHEETS—SHEET 1.
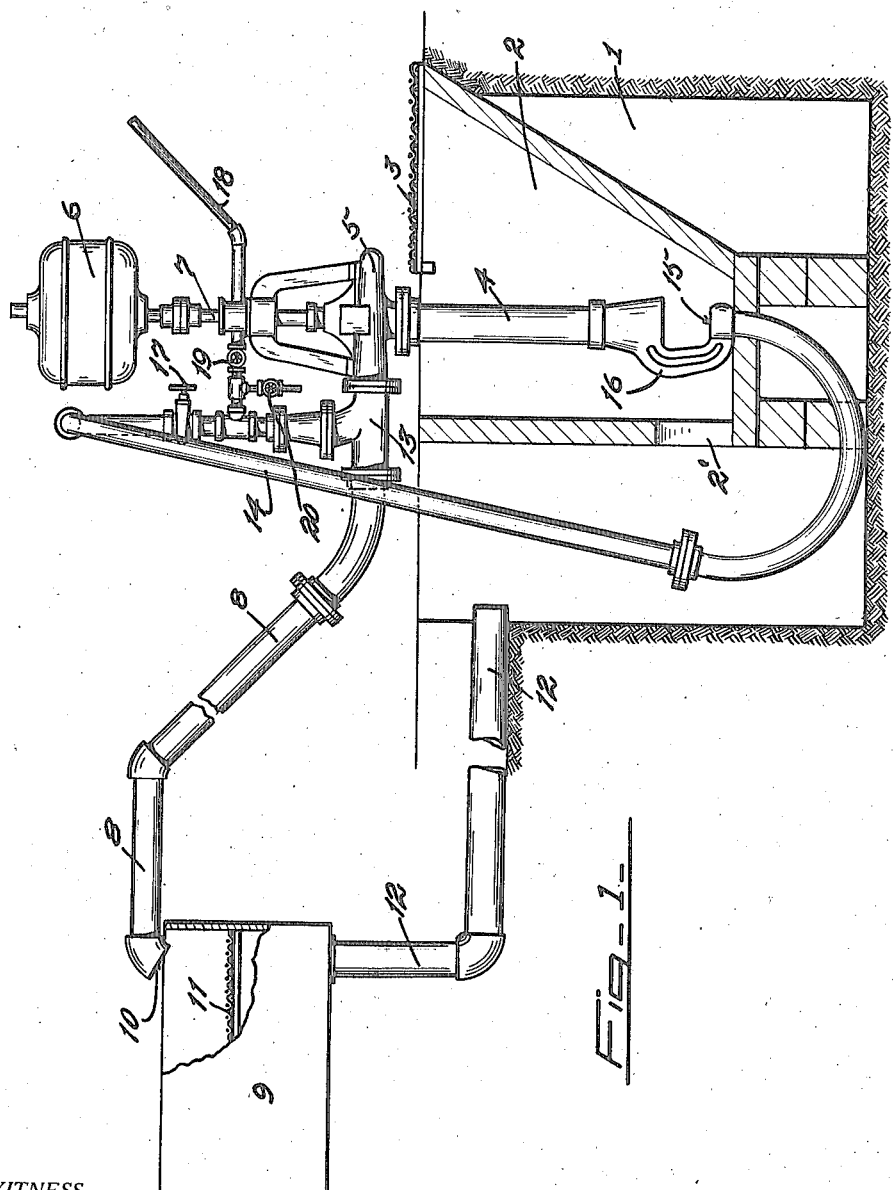

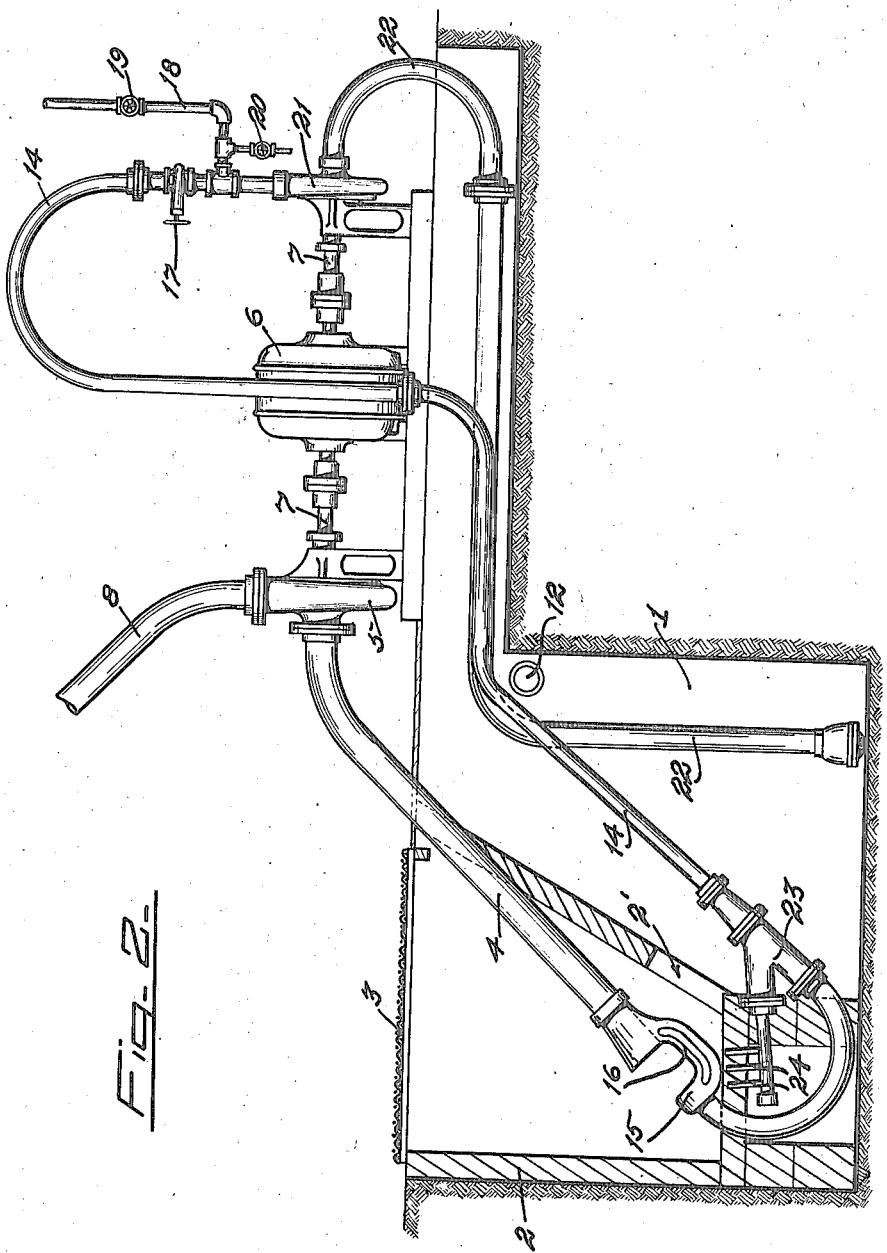

UNITED STATES PATENT OFFICE.

AUGUST SCHILLING, OF OAKLAND, CALIFORNIA.

APPARATUS FOR THE TRANSPORTATION OF SOLIDS IN PIPE-LINES.

1,264,683.　　　　　　Specification of Letters Patent.　　Patented Apr. 30, 1918.

Application filed March 29, 1917. Serial No. 158,248.

*To all whom it may concern:*

Be it known that I, AUGUST SCHILLING, a citizen of the United States, residing at Oakland, in the county of Alameda and State of California, have invented certain new and useful Improvements in Apparatus for the Transportation of Solids in Pipe-Lines, of which the following is a specification.

The present invention relates to an apparatus for the transportation of solids in pipe lines by means of liquid conveying media.

The invention is particularly applicable to the transportation of crystalline salt in brine and will be so described and illustrated hereinafter, but it is to be understood that its use is not so restricted, but that it may be employed for the transportation of any other solid material of like nature in any suitable liquid. As an apparatus for the transportation of salt the invention constitutes an improvement on the processes for which United States Letters Patents Nos. 1,091,252 and 1,091,251 were granted to John Stauffer on March 24, 1914, under title of Method of cleaning salt and method of transportating salt, respectively.

In the method disclosed in the aforementioned Patent #1,091,252 crystalline salt is dumped into a brine solution and is transported in suspension in said brine through suitable devices by means of a pump. In the use of this method for conveying salt it has been found in practice that not more than three per cent. of crystalline salt can be conveyed in the brine solution. If more than this amount is dumped into the brine the solid material collects and piles up at the entrance of the pump intake pipe and clogs the same, thereby destroying the lifting power of the pump. The object of the present invention is to provide a pump and pipe system which will take up and carry with the fluid a relatively large proportion of solids. When used for salt conveying actual tests under practical working conditions have demonstrated that an apparatus constructed under the principles of my invention is capable of transporting as high as 35% of crystalline salt in brine without any noticeable clogging either at the intake of the pipe or at any point in the pipe line. By thus increasing the amount of salt transported in a given amount of brine the expense of such transportation is greatly reduced and the size of the plant, and consequently the initial cost thereof, is also reduced.

The invention will be hereinafter described and is illustrated in the accompanying drawings in its preferred form, but it is to be understood that changes in the form and construction of the device, within the scope of the claims hereto appended, may be made without departing from the spirit of the invention.

In order to comprehend the invention reference should be had to the accompanying drawings, wherein:—

Figure 1 is a side elevation of the preferred form of apparatus for carrying out my invention.

Fig. 2 is a side elevation of a modified form of apparatus.

In the drawings, the reference numeral 1 represents a well or sump adapted to contain the liquid conveying medium, in the present case, brine. A hopper 2 is located within said sump and is partially covered by a screen 3. Openings 2' are provided in the wall of said hopper to enable the liquid from said sump to enter, but said openings, being preferably in the form of narrow slits, prevent any solid material from escaping from the hopper to the sump. The salt to be conveyed is dumped into the hopper 2 through the screen 3, said screen preventing the entrance of any particles or lumps too large to be properly handled by the conveying apparatus.

Within the hopper 2 and extending nearly to the bottom thereof is a pipe 4 which forms the intake pipe for a centrifugal pump 5 located above the hopper at the upper end of said pipe 4. The pump 5 may be driven by any convenient means, as for example an electric motor, illustrated at 6 and connected with said pump by means of a shaft 7. The outlet of the pump 5 is continued as a pipe line through which the brine, with the salt in suspension therein, is conveyed to any desired place of deposit. In Fig. 1 of the drawings I have shown a receiving tank 9 into which the brine from the outlet 10 of the pipe line 8 is dumped, and over which is placed a screen 11 to catch the salt and remove the same from said brine. A return pipe line 12 is provided for conveying the brine back from the discharge tank 9 into the sump 1.

At the outlet of the pump 5 the discharge pipe 8 is provided with a T 13, whose branch extends upwardly and connects with a pipe 14 extending back into the sump 1. The outlet of said pipe 14 is positioned in the bottom of the hopper 2, in alinement with the lower end of the intake pipe 5 and is spaced therefrom as shown at 15. A bracket 16 is provided to hold the ends of said pipes 4 and 14 in proper relation. A control valve 17 is provided in the pipe 14 and a branch pipe 18 is connected with said pipe 14, through which water from any convenient supply may be introduced. A valve 19 is provided in said water inlet pipe 18 and a drain or test valve 20 is also included therein.

The operation of the apparatus is as follows:

The salt is dumped into the hopper 2 through the screen 3. The pump 5 is then started and the brine from the sump 1 is drawn up through the intake pipe 4, carrying therewith the salt in suspension. Said brine with the salt contained therein is conveyed through the pipe line 8 to the discharge station, at which the salt is removed from the brine by the screen 11, and the brine allowed to return to the sump, through the return pipe 12. A portion of the brine from the discharge pipe 8 is led off through the pipe 14, and issues from the mouth 15 thereof as a stream having considerable velocity and directed at the mouth of the intake pipe 4. This stream issuing from the pipe 14 acts as an injector to forcibly carry into the intake pipe 4 the salt which collects in the bottom of the hopper 2 and thereby prevents said salt from piling up in the bottom of said hopper and clogging the intake of said pipe 4. By thus positively injecting the salt into the mouth of the intake pipe, and preventing the clogging thereof, a greatly increased amount of salt can be handled in a given quantity of brine by a given size of pump and pipe. By taking the pipe 14 out of the upper side of the horizontal portion of the discharge pipe 8 of the pump, very little salt is taken off through said pipe 14, for the reason that the salt suspended in the brine solution flowing through the horizontal portion of the pipe 8 naturally lies in the lower portion of said pipe, the upper portion of the stream flowing therein containing very little of the crystalline salt. Thus the removal of a portion of the liquid through the injector pipe 14 does not reduce the conveying capacity of the plant, but on the contrary reduces the total amount of material flowing through the pipe 8. A smaller pipe may therefore be used than would otherwise be the case.

If the brine in the system becomes depleted, fresh water may be added thereto through the pipe 18. In this connection it may be stated that the brine solution need not be saturated, because the crystalline salt dissolves very slowly even in fresh water. Therefore the addition of fresh water to the brine does not materially affect the capacity of the plant.

In Fig. 2 of the drawings, I have shown a modified form of apparatus embodying my invention. In this form the driving shaft 7 of the motor 6 is horizontal, and the suction intake pipe 4 is inclined within the hopper 2 of the sump 1. In this apparatus two pumps are used, the main pump 5 being used solely for pumping the salt and brine mixture through the conveyer pipe 8. An auxiliary pump 21, driven from the motor shaft 7, draws brine from the sump 1, outside the hopper 2, through a suction pipe 22, and discharges the same into the injector pipe 14, said injector pipe having its outlet 15 in the bottom of the hopper 2, and spaced from and in alinement with the end of the suction intake pipe 4. A fresh water inlet is provided at 18 for supplying water to the injector pipe 14. A valve-control 17 is provided in said injector pipe; a fresh water valve 19 is provided in the fresh water pipe 18; and a draw-off valve 20 is also provided as in the previously described form of the apparatus.

In this form of the invention, I prefer to use a jet or a number of jets of liquid to stir up the salt in the bottom of the hopper 2. For this purpose, I provide a branch 23, in the injector pipe 14, said branch ending in a number of stirring nozzles 24 positioned in the bottom of the hopper 2 and directed upwardly in the region of the mouth of the suction pipe 4.

The operation of the modified form of apparatus illustrated in Fig. 2 of the drawings is essentially similar to that of the apparatus shown in Fig. 1. The brine with the salt in suspension is drawn up through the suction intake pipe 4 and is conveyed through the discharge pipe 8, by the pump 5, to any suitable place of deposit, not shown in the drawings, at which the salt is understood to be separated from the brine in any desired manner and said brine returned to the sump 1, issuing thereinto through the pipe 12. The injector pump 21 draws brine from the sump 1 through the pipe 22, and discharges the same through the pipe 14 as a stream having suitable velocity and directed into the mouth of the intake pipe 4. At the same time a portion of the brine in the injector pipe 14 issues in the form of upwardly directed streams through the stirring nozzles 24. The combined action of the stream from the injector pipe 14 and the stream from the stirring nozzles 24 prevent the salt in the bottom of the hopper 2 from clogging around the mouth of the suction pipe 4. As in the previously described form the brine may be replenished with fresh water through the pipe 18.

In practice, it is preferable to construct the suction pipe 4 with a diameter slightly larger than that of the conveyer pipe 8. By so doing, the velocity of the liquid is greater in said conveyer-pipe 8 than in the suction pipe 4, and therefore the tendency to clog in said conveyer pipe will be less than in said suction pipe, so that if any clogging does occur it will be localized in the suction pipe, where it is easily removed. It may be stated in this connection that the fresh water from the pipe 18 may be used in cases of emergency to flush the system and remove clogged salt therefrom.

The position of the outlet 15 of the injector pipe 14 with respect to the mouth of the suction intake pipe 4 is important. In the vertical form shown in Fig. 1 of the drawings, the injector pipe and the suction pipe should be centrally alined, and in the inclined form shown in Fig. 2 of the drawings, the mouth of the injector pipe should be positioned as to direct the stream therefrom against the lower surface of the suction pipe 4, for the reason that the greater part of the salt carried into said suction pipe 4 will lie along the lower portion thereof. The mouth of the injector pipe and the mouth of the suction pipe should be spaced by a distance not less than the diameter of said suction pipe, in order to enable the stream issuing from said injector pipe to impart sufficient velocity to the salt engaged thereby before entering the mouth of the suction pipe, but this distance must not be so great as to permit the stream issuing from the injector pipe to lose any material portion of its own velocity. It will be seen from this statement, that the velocity of the stream issuing from the injector pipe constitutes the agency relied upon for carrying the salt collecting in the bottom of the hopper into the mouth of the suction pipe.

The form of the invention shown in Fig. 1 of the drawings is preferably for the reason that but one pump is necessary. At the same time, the carrying capacity of the pipe line 8 is increased rather than diminished by removing therefrom a portion of the brine. As before stated the removal of the brine from the upper portion of said pipe 8 does not result in the removal of any material portion of the salt therefrom.

Having thus described the invention, what I claim as new and desire to protect by Letters Patent is:—

An apparatus for the described purpose comprising a sump adapted to contain a liquid, a hopper within said sump adapted to contain solids suspended in said liquid, a pump having a suction intake positioned within said hopper adjacent its base, a discharge pipe leading from said pump and adapted to convey the liquid with the solids suspended therein, means at a point distant from said sump for receiving said conveyed liquids and solids for separating said solids from said liquid, means for returning the separated liquid to said sump, an injector nozzle extended into said hopper at its base and positioned in alinement with and spaced from the suction intake of said pump, permitting the solids in said sump to collect around said suction intake, whereby the fluid discharging from said injector nozzle forces the same under pressure into said suction intake, and a connection between said discharge pipe and said injector nozzle for conveying a portion of the liquid in said discharge pipe under pressure to said nozzle.

In testimony whereof I have signed my name to this specification in the presence of two subscribing witnesses.

AUGUST SCHILLING.

Witnesses:
HENRY B. POST,
ALLEN HOAR.